Figure 1:
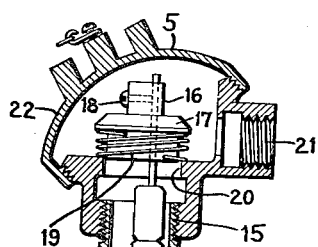

March 21, 1939.  A. L. BAKER  2,151,648

TEMPERATURE MEASURING DEVICE

Filed June 8, 1937

INVENTOR
ALBERT L. BAKER
BY
ATTORNEY

Patented Mar. 21, 1939

2,151,648

UNITED STATES PATENT OFFICE 2,151,648

TEMPERATURE MEASURING DEVICE

Albert L. Baker, Summit, N. J., assignor to The M. W. Kellogg Company, New York, N. Y., a corporation of Delaware Application June 8, 1937, Serial No. 147,047

10 Claims. (Cl. 136—4)

This invention relates to temperature measuring devices, and refers in particular to a thermocouple adapted to measure the temperature of a tubular heating element positioned within a heating apparatus and to a method of installing such thermocouple. The invention has general application in any heating apparatus employing a tubular heating element, but is particularly adapted for use in a furnace wherein one or more streams of fluids to be heated is passed through tubes positioned within a heating chamber containing hot furnace gases, and especially in such furnaces employed in the pyrolytic treatment of hydrocarbon fluids.

An accurate measurement of the tube skin temperature is particularly desirable in a furnace for heating hydrocarbons to serve as a guide both as to the condition of the tubes and also as to the proper operation and control of the furnace itself and the process with which it is being used. In the past, however, thermocouples have been generally unsatisfactory for this purpose because of inaccuracies in the results obtained and the fact that the errors of even a single couple are inconsistent so that successive readings are not relative. Thus, three similar thermocouples arranged on a tube as close to the same point as possible gave entirely different and variable readings. This variation is caused by flow of heat from the thermocouple wire to the hot junction. The amount of this heat flow varies with changes in the temperature and velocity of the hot furnace gases, changes in the condition of the wire due to oxidation or corrosion, and changes in the position of the wire caused by sagging, or loss of physical properties due to exposure to heat. Variations between the readings of different thermocouples result from these causes and also from differences introduced in installing the thermocouples.

An object of the present invention is to provide a new and improved thermocouple for measuring the skin temperatures of tubular elements employed in heating apparatus, particularly the tubes of a furnace for heating hydrocarbons, which is more accurate and consistent than thermocouples and arrangements thereof heretofore proposed for measuring tube skin temperatures and which overcomes many of the difficulties and disadvantages encountered with such prior devices.

It is also an object of the invention to provide a new and improved means for indicating the condition of a furnace tube and for controlling the firing of heating apparatus and the heating of fluids therein.

Figure 2:
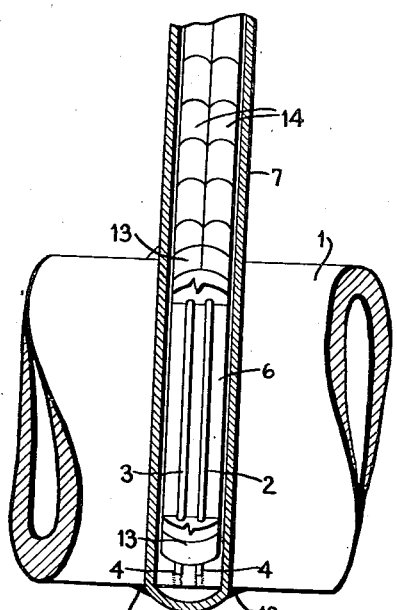

Other objects and advantages reside in the method, arrangement, structure and combination of parts hereinafter described and illustrated in the drawing in which like reference characters indicate like parts in the several views and in which:

Fig. 1 is a view partly in section of a thermocouple constructed and installed in accordance with the invention, and Fig. 2 is a view taken at right angles to Fig. 1 with a portion broken away.

Referring to the drawing, the numeral 1 indicates a metal tube such as is used for passing a fluid stream through a heating chamber to be heated therein. In such application the tube 1 is positioned within a heating chamber or zone containing high temperature furnace gases, and the fluid to be heated, a hydrocarbon fluid, for example, is passed through the interior of the tube. The thermocouple comprises a pair of wires 2 and 3 which are securely fastened to the tube 1 at 4 to provide a hot junction, are thence wrapped around the tube for a portion of their length, 2 and are then led to a thermocouple head 5 located at the exterior of the heating zone within which the tube 1 is positioned. The thermocouple wires 2 and 3 may be made of any suitable material, but preferably consist, respectively, of an 18% chromium, 8% nickel steel alloy and a metallic alloy sold under the trade name "Chromel". The wires may be of any desired size but preferably have a gauge range from No. 14 to No. 20. In general a smaller wire gives better accuracy, but its life under severe temperature conditions in shorter, and the error caused by deterioration of the wire is greater than with the larger size. Where the wire is exposed to furnace gases at a temperature of around 1100° F., for example, it is preferable to use a No. 14 gauge wire rather than a No. 20 since its average life is approximately three times as long, but where the wire is protected from the hot furnace gases a No. 18 or 20 gauge wire will give greater accuracy.

The hot junction 4 is preferably provided by peening the wires to the tube with the wires flush with the exterior surface of the tube. This connection is preferably made by cutting two grooves on the exterior surface of the tube approximately ⅜ of an inch apart and approximately ½ inch long in a direction transverse to the length of the tube. The ends of the wires 2 and 3 are disposed in the respective grooves and securely peened therein along the length of the grooves. That portion of the wires which is disposed within the grooves is preferably flattened before insertion therein to provide the maximum practical surface for heat flow at the hot junction, and the grooves are made sufficiently deep to permit the wires to lie flush with the exterior surface of the tube when disposed therein. The grooves may be cut with a chisel or saw. Such connection between the thermocouple wires and the tube at the hot junction not only provides a more satisfactory hot junction, but also permits the wires to be wrapped around the tube with the least amount of bending at the connection, thereby increasing the strength of the thermocouple and permitting the wires to lie close to the tube throughout the entire length of the wrap.

The thermocouple wires are wrapped around the tube for a distance of at least 4 inches and preferably for a distance of 5 or 6 inches with tubes having an outside diameter of 4 to 5½ inches. A wrap of 105°, as indicated in the drawing, has been found satisfactory. A sheet of electrical insulating material 6 is inserted between the thermocouple wires and the tube 1, except at the connections between the wires and tube, to insulate the wires electrically from the tube. The sheet 6 should be a good heat conductor as well as an electric insulator. An exfoliated sheet of mica approximately .005 of an inch thick is particularly adapted for this purpose, but the invention contemplates the use of any suitable material which is a good electrical insulator and a poor thermal insulator. The sheet of insulating material 6 should be inserted between the wires and tube as close to the hot junction as possible.

Any heat flowing from the hot gases directly or indirectly to the thermocouple wires is thus retransmitted by conduction through the mica to the cooler tube. The flow of heat along the wires to the hot junctions is thus reduced to a minimum and the hot junction is at, or nearly at, the temperature of the tube skin. When the tube 1 is positioned in a chamber containing high-temperature furnace gases the thermocouple wires 2 and 3 are preferably enclosed throughout their entire length within such chamber by a metallic shield 7 which protects the wires from such gases. The shield 7 may be made of any desired material, but preferably consists of an 18% chromium, 8% nickel corrosion-resisting alloy steel. The shield 7 is provided with an open portion 8 which fits around the tube and encloses the hot junction and that portion of the thermocouple wires which are wrapped around the tube, and with a tubular portion 9 which extends from the tube to the exterior of the gas-containing chamber and encloses that portion of the thermocouple wires which leads from the tube to the thermocouple head. The shield 7 is preferably welded to the tube 1 along the edges of the open portion 8, as indicated at 10, 11 and 12, to provide a gas-tight seal between the shield and tube. Suitable means such as semi-circular insulators 13 and bead insulators 14 are provided to insulate the thermocouple wires from the metallic shield. The shield 7 is so shaped that the thermocouple wires 2 and 3 leading to the head 5 leave the tube at substantially a tangent to maintain the wrap.

The thermocouple head 5 is preferably attached to the end of the shield 7 by suitable means such as the threads 15. A block 16 provided with a disc 17 of enlarged diameter is positioned within the head 5. The thermocouple wires 2 and 3 are adapted to pass through holes provided in the block 16 and disc 17, and the block 16 is securely fastened to the wires by suitable means such as set screws 18. A spring 19 is disposed between the disc 17 and a shoulder 20 provided within the thermocouple head. The spring 19 applies a continuous tension upon the thermocouple wires 2 and 3, thereby pulling said wires tight against the insulating sheet 6 and providing a tight wrap of the wires and insulating sheet around the tube 1. In this manner the wire is always maintained in close heat-conducting relationship to the tube throughout the length of the wrap irrespective of any changes in the length of the wire caused by expansion or other factors during the use of the device. The thermocouple head 5 is provided with outlet 21 through which wires connecting with the desired electrical measuring instrument may be introduced into the head and connected to the thermocouple wires 2 and 3. These connections may have the same composition as the thermocouple wires or may be of a different composition. In the latter case the thermocouple head serves as the cold junction. The thermocouple head is provided with a removable cap 22 to facilitate the attachment of the block 16 to the thermocouple wires and the connection with the external leads.

In installing the thermocouple the grooves on the exterior surface of the tube are first cut and the ends of the thermocouple wires peened therein as hereinabove described. The strip of insulating material 6 is then placed against the tube surface and the wires wrapped around the tube. The shield 7 is cut and bent to provide the desired fit of the portion 8 around the tube and to give the desired offset for the thermocouple head 5. The ends of the wires are then inserted through the tubular portion 9 of the shield 7. The insulators 13 and 14 are placed on the wire before the shield 7 is placed in position. When thus in place the shield 7 fully encloses the thermocouple wires except at the end of the portion 8 of the shield 7 where a tapered portion 23 provides an opening through which the thermocouple may be examined. The shield is then welded to the tube to provide a gas-tight seal at all points except the opening adjacent the hot junction 4, as indicated at 10 and 12. The thermocouple may then be inspected to see that it is installed properly and that the wires are not grounded to the shield. The tapered end 23 of the shield is then bent down, as indicated at 24, to close the opening formerly provided thereby, and is welded to the tube, as indicated at 11, to provide a gas-tight seal. The shield may be tested under a pressure preferably of the order of 100 pounds per square inch by attaching an air line to the tubular portion 9 of the shield. After any such test the thermocouple head is placed in position, the thermocouple wires secured in the block 16 with spring 19 in compression, and the desired connections made.

A plurality of the thermocouples may be installed upon the internal tubes of a furnace wherein hydrocarbons are heated to conversion temperatures and provide an accurate means for determining the condition of the tubes and for controlling the temperature, firing and distribution of heat. In this manner the invention provides improved furnace operation and a positive control of the heating process.

In the embodiment of the invention illustrated in the drawing and hereinabove described two thermocouple wires 2 and 3 are provided. The invention contemplates, however, an embodiment in which only a single wire, such as 2 or 3, is employed, and the return connection is made through the shield 7 or tube 1. The invention further contemplates the use of a thermocouple without the shield 7 and the use of any desired means for applying a continuous tension upon the thermocouple wires.

The thermocouple wires 2 and 3 may, if desired, be flattened throughout that portion of their length which is wrapped around the tube and disposed with the flat sides against insulation 6 to assist in maintaining the wires at substantially the same temperature as the tube wall, or flat wires may be provided for this purpose. Many other variations and modifications may be made without departing from the spirit and scope of the invention.

I claim:

1. In a device for measuring the skin temperature of a tubular member positioned within a heating apparatus, a thermocouple wire, means providing a tight connection between one end of said wire and the exterior surface of said tubular member, means supporting said wire whereby a portion of its length adjacent said connection is wrapped around at least a part of said tubular member, means comprising a layer of heat conducting electrical insulating material for electrically insulating said wire from said tubular member except at said connection between the wire and tubular member, and means for applying a continuous tension upon said wire to maintain the wire tight against said heat conducting electrically insulating material and tubular member throughout the length of said wrap irrespective of changes in the length of the wire.

2. A device as defined in claim 1 wherein said heat conducting electrical insulating material comprises a thin sheet of mica.

3. A device as defined in claim 1 wherein said wrap extends at least 4 inches around the exterior surface of said tubular member.

4. A device as defined in claim 1 wherein said wrap subtends an angle of at least 105 degrees at the axis of said tubular member.

5. A device as defined in claim 1 wherein said thermocouple wire is flat for at least a portion of its length at the end thereof which is connected to the tubular member, said flat end of the wire is disposed within an elongated groove provided on the exterior surface of said tubular member in a direction substantially transverse to the length of the tubular member, and a peen connection between the end of said wire within said groove and the tubular member.

6. A device as defined in claim 1 wherein said thermocouple wire is flat for at least a portion of its length at the end thereof which is connected to the tubular member, said flat end of the wire is disposed within an elongated groove provided on the exterior surface of said tubular member and extending approximately one-half inch around the surface of said tubular member in a direction substantially transverse to the length of the tubular member, and a peen connection between said wire and tubular member for substantially the entire length of said groove.

7. In a device for measuring the skin temperature of a tubular material positioned within a heating chamber containing hot furnace gases, a thermocouple wire, means for providing a tight connection between one end of said wire and the exterior surface of said tubular member, means including a shield adapted to enclose said wire throughout its entire length within said gas-containing heating zone for supporting said wire whereby a portion of its length adjacent said connection is wrapped around a part of said tubular member, means providing a gas-tight seal between said shield and said tubular member, means comprising a layer of heat conducting electrical insulating material for electrically insulating said wire from said tubular member except at said connection between the wire and tubular member, and means including a spring cooperating with said supporting means for applying a continuous tension upon said wire to maintain the wire tight against said insulating material and tubular member throughout the length of said wrap irrespective of changes in the length of the wire.

8. A device of the character described adapted for measuring the skin temperature of a tubular member, including a thermocouple wire connected at one end to the exterior surface of said tubular member, a portion of said wire being wrapped around at least a part of said tubular member, heat conducting electrical insulating material between the wrapped portion of said wire and said tubular member for electrically insulating said wire from said tubular member except at said connection between said wire and tubular member, and means for maintaining said wire under tension to maintain the wrapped portion of said wire in contact with said heat conducting electrical insulating material and said tubular member when the device is in use.

9. A device of the character described adapted for measuring the skin temperature of a tubular member exposed to hot furnace gases, including a thermocouple wire connected at one end to the exterior surface of said tubular member, a portion of said wire being wrapped around at least a part of said tubular member, a layer of heat conducting electrical insulating material for electrically insulating said wire from said tubular member except at said connection between said wire and said tubular member, a shield connected at one end to said tubular member for enclosing said wire, said shield having an abutment near its other end, a disc member adjacent said abutment and secured to the other end of said wire, and a spring between said disc member and said abutment for maintaining said wire under tension to maintain said wire in contact with said heat conducting electrical insulating material and said tubular member when the device is in use.

10. A device of the character described adapted for measuring the skin temperature of a tubular member exposed to hot furnace gases, including a thermocouple wire connected at one end to the exterior surface of said tubular member, a portion of said wire being wrapped around at least a part of said tubular member, a layer of heat conducting electrical insulating material for electrically insulating said wire from said tubular member except at said connection between said wire and said tubular member, a shield connected at one end to said tubular member adjacent said wire connection for enclosing said wire, said shield having an abutment near its other end, and means associated with the other end of said wire and including a spring for maintaining said wire under tension to maintain said wire in contact with said heat conducting electrical insulating material and said tubular member when the device is in use.

ALBERT L. BAKER.